US005536357A

United States Patent [19]

Kovacs

[11] Patent Number: 5,536,357

[45] Date of Patent: Jul. 16, 1996

[54] BAG GRIPPING AND TRANSFER APPARATUS AND METHOD

[75] Inventor: Lloyd Kovacs, Sheboygan, Wis.

[73] Assignee: Hayssen Manufacturing Company, Sheboygan, Wis.

[21] Appl. No.: 242,735

[22] Filed: May 13, 1994

[51] Int. Cl.$^{6}$ .......... B32B 31/00

[52] U.S. Cl. .......... 156/566; 156/477.1; 156/515; 53/451; 53/552; 53/136.5; 198/470.1; 493/193

[58] Field of Search .......... 156/566, 556, 156/515, 569, 572, 443, 477.1, 478–480, 483, DIG. 1, DIG. 42; 53/450, 451, 455, 477, 562, 552, 136.5, 138.3; 493/189, 193, 194, 209, 227; 198/470.1, 728, 377

[56] References Cited

U.S. PATENT DOCUMENTS 4,517,790 5/1985 Kreager .......... 156/515 X
4,571,236 2/1986 Adams .......... 198/470.1 X
5,031,380 7/1991 Ueda .......... 53/552 X
5,213,198 5/1993 Kovacs .......... 198/728

*Primary Examiner*—James Engel
*Attorney, Agent, or Firm*—Lee, Mann, Smith, McWilliams, Sweeney & Ohlson

[57] ABSTRACT

A method and apparatus for gripping a bag and downstream handling, such as application of a header label to the bag. The bag, which has previously been filled with a product, is presented to the apparatus at an upstream bag presentation and accepting station and is gripped proximate its top. It is then transferred from the upstream bag accepting station to a downstream bag release station. Before being released, the bag travels to an intermediate label application station where a label is readied, the label then being transferred upstream to a second position and applied to the bag. Thereafter, the bag proceeds downstream, with the label, and the label is sealed to the bag. A series of grippers are employed for accepting a stream of discreet bags in a continuous manner. The grippers are recirculated continuously so that the apparatus operates continuously so long as bags are presented for application of a label.

14 Claims, 8 Drawing Sheets

BAG GRIPPING AND TRANSFER APPARATUS AND METHOD

BACKGROUND OF THE INVENTION

This invention relates to vertical form, fill and seal machines, and more particularly to a method and apparatus for gripping a bag and then processing the gripped bag downstream, such as applying a header label to the bag, particularly but not limited to after the bag has been filled by a vertical form, fill and seal machine.

When bags are formed by a vertical form, fill and seal machine, the bags are filled with a product and ready for further handling, such as packaging in a carton or downstream processing. If downstream processing is desired by a machine, it is important that the bag leave the vertical form, fill and seal machine under control, that is, held in proper alignment for its downstream processing. However, since the vertical form, fill and seal machine is also continuously forming bags in series, formed bags must also be moved out of the path of an oncoming bag as that bag is being formed in order to not interfere with the bag and therefore slow the operating speed of the vertical form, fill and seal machine.

For many years, labels, typically pre-printed paper labels, have been applied to the top of bags, originally as an inexpensive way of identifying the manufacturer and the contents of the bag, without having to print on the bag itself. This system used to be particularly important to manufacturers who had many different products, many of which could be packaged in the same size bag.

The cost of having printed bags for each different product was prohibitive, but it was relatively inexpensive to buy plain, unprinted bags and have small quantities of labels separately printed for various products. The labels, either being plain or heat seal coated, and the cost of sheet printing and cutting to size for the labels are relatively modest in relation to printing of different bags for different products.

The first machines for applying labels to bags were developed in the 1950's. These machines where semiautomatic, using clamping jaws to apply plain paper labels to bags. The operator typically placed the bag in a position adjacent to sealing jaws with a label in position, a folder blade folded the top of the bag and the label together, and the heated jaws were then closed on the bag under very high pressure. The combination of heat and pressure adhered the label to the bag top. Such machines were manufactured by the Doboy Company of New Richmond, Wis., U.S.A.

The rate of operation of these semiautomatic machines relied to a large degree on the dexterity of the machine operator. Rates of 20 to 25 bags per minute per operator are common, but given the required human interaction and stepwise functioning of the machine, much faster rates could not be obtained.

In order to increase productivity, continuous automatic machines where introduced in the late 1950's, also by Doboy Company. These machines operated at a rate of about 60 bags per minute, but because of their continuous motion, insufficient pressure could be generated to handle plain paper labels, and consequently more expensive heat seal coated label paper had to be used. An operator was still required to place the bag into the continuous motion infeed of the automatic machines. No means was provided for automatically gripping the bag and then introducing it into the continuously-moving machine.

Both semiautomatic and automatic machines, such as those described above, applied what is known in the industry as a "saddle label", a label that is folded so that a portion appears on both the front and rear of the bag. A saddle label can have equal portions on both the front and rear of the bag, or can be offset, usually to the front of the bag, so that a larger portion of the label appears on the bag front.

The Doboy machines also had the capability of punching a hole in the finished bag to enable the bag to pegged or racked at a point of sale. The label also reinforced the strength of the bag in the area of the hole to prevent tearing when the bag is hung.

While such machines are faster than strictly manual application of a label to a bag, in the case of both semiautomatic and automatic machines, if the operator presents the bag to the machine in an out of square condition, the label is applied out of square to the bag, resulting in an unsightly bag. This result often occurs given the fact that an inexact human step is involved in both processes. Because of the repetitive nature of the operation, many prior processes include counter balance devices to reduce operator stress and fatigue, but speeds are still held to a maximum of approximately twenty bags per minute per human operator.

Attempts have been made to completely automate application of a label to a bag emanating from a vertical form, fill and seal machine. The most successful of these attempts has been to apply a label to the front of the bag only (not a saddle label) by tacking a heat seal label to the bag film in the area of the forming tube (before the bag is filled) so that as the forming tube is advanced, the label is stopped in the area of the sealing jaws, where it is heat sealed to the bag, a hole is punched, and the bag is severed just above the label. Such machines were made by Hayssen Manufacturing Company, Sheboygan, Wis., U.S.A. beginning in about the mid 1960's.

Another method of forming a sealed bag is to apply a "simulated header", where the packaging material is actually printed to look like a header, and the sealing system of the vertical form, fill and seal machine is enlarged to seal the complete area of the simulation of the label. In the case of polyethylene, a seal is made at the top of the simulated area and a secondary seal is made at the bottom of the simulated area. However, no label is actually applied to the bag.

No apparatus or method exists to automatically apply a saddle label, made only of paper, to the top of a bag with the label being absolutely square on the top of the bag. The purpose of the present invention is to provide a method and apparatus, automatic from start to finish, for regularly and accurately applying saddle labels to bags in a fully automatic fashion.

SUMMARY OF THE INVENTION

The invention pertains to an apparatus for gripping a bag and for applying a header label to a bag, as well as the process for doing so. In its preferred form, the apparatus is for gripping a bag made on a vertical forms fill and seal machine and for handling the bag after it is gripped. A gripper is provided for gripping the bag immediately below sealing jaws of the vertical form, fill and seal machine. Means is provided for moving the gripper in relation to the bag from a side of the bag to a position for gripping the bag along a top portion of the bag below the sealing jaws. Means is also provided for actuating the gripper for gripping the bag before the bag is released from the vertical form, fill and seal machine. Means is further provided for moving the gripped bag out of the path of a next bag as the machine forms the next bag, without first moving the gripped bag in a downstream direction in relation to the machine. Finally, means is provided for transferring the moved and gripped bag in the downstream direction to a downstream position for further processing of the bag.

The gripper comprises opposite gripping elements mounted on an actuating shaft, with the shaft being located in a housing and including means mounting the housing on the transferring means. Preferably, the moving means includes an actuator engageable with and for shifting the housing from a bag presentation position to a bag conveying position. In that regard, the housing includes a lug and the actuator includes a gripper element selectively engageable with the lug to laterally move the housing in relation to the transferring means. The housing is slidably mounted on a locating spindle which extends laterally from the transferring means.

The housing includes clamping means for the actuating shaft to retain the shaft at an elevated orientation and a lowered orientation, and also to permit vertical translation of the shaft between the two orientations. An actuator is engageable with the shaft in order to lower the shaft from the elevated orientation to the lowered orientation.

The actuating means for the gripper comprises a rotary spindle extending in the actuating shaft of the gripper. Means is provided for rotating the spindle to open and close the gripping elements of the gripper.

A label application station is located downstream from the bag gripping location. The label application station includes a first position for readying a label for application to the bag and a second position for applying the label to the bag. The second position is located upstream of the first position. Means is also provided for sealing the label to the bag.

In accordance with the preferred form of the invention, the label application station includes a label source and a label orienting, folding and applying mechanism. The label orienting, folding and applying mechanism comprises an elongated mandrel and a label locator which is disposed at one side of the mandrel. Means is provided for clamping and gripping the label against the mandrel when the label is in the label locator. Means is also provided for folding a label over the mandrel. The folding means comprises a tucker plate disposed above the label locator, and includes first means for laterally shifting the tucker plate over the mandrel and second means for shifting the tucker plate downwardly toward the mandrel.

Means is also provided for indexing the label orienting, folding and applying mechanism upstream from the first position to the second position in order to deposit the folded label in a position to mate with the bag. The mandrel includes a longitudinal channel in alignment with a bag to accommodate the indexing of the label orienting, folding and applying mechanism.

A secondary gripping means is provided for retaining a bag at the second position. The secondary gripping means comprises opposed clamp elements which are disposed beneath the gripping elements of the gripper when a bag is also at the second position. Means is provided for activating the clamp elements to engage a bag therebetween so that the gripping elements can be released during the actual positioning of the label and can be reclosed over the label (and the bag) to maintain the label in position over the bag for downstream movement after the clamp elements have been released.

Preferably the sealing means is located downstream at a bag release station. The sealing means comprises opposite heat sealing jaws. Means is provided to close the heat sealing jaws to seal a label to a bag. The heat sealing jaws also preferably include means for forming a hole in the bag through the sealed label and bag for later hanging of the bag.

In accordance with the process of the invention, a bag is gripped squarely at a first location proximate its top at an upstream bag presentation position before the bag is released by the vertical from fill and seal machine which provides the bag to the apparatus. The bag is then transferred to the downstream application station, at which location a label is applied to the bag. First, the label is readied at the first position, and then the readied label is indexed from the first position upstream to the second position where it is applied to the bag. Then, the label is sealed to the bag.

In the step of readying the label, included are the further steps of isolating a label from a supply of labels, folding the label over a mandrel and then retaining the label on the mandrel while the mandrel is indexed with the retained label to the second position. After indexing and application of the label, the label and bag are then transferred from the mandrel to the downstream label sealing station.

At the bag accepting station, the process includes the further steps, after gripping of the bag, of moving the gripped bag laterally from an outboard orientation to an inboard orientation in relation to the conveying means. The gripper and the gripped bag are then lowered from the elevated position to the lowered position. This is required in order to avoid interference with the next bag as it is being pulled, or interference with the machine frame as the griper and gripped bag are moved from the bag accepting station.

It is preferred that there be a plurality of the grippers, spaced serially and arranged in a recirculating fashion for automatic operation of the process according to the invention. As the grippers are returned to the bag accepting station, a preferred part of the process includes raising the gripper from the second elevation to the first elevation and then laterally shifting the gripper from the inboard position to the outboard position.

BRIEF DESCRIPTION OF THE DRAWINGS

The invention is described in greater detail in the following description of an example embodying the best mode of the invention, taken in connection with the drawing figures, in which.

DESCRIPTION OF AN EXAMPLE EMBODYING THE BEST MODE OF THE INVENTION

Figure 1:
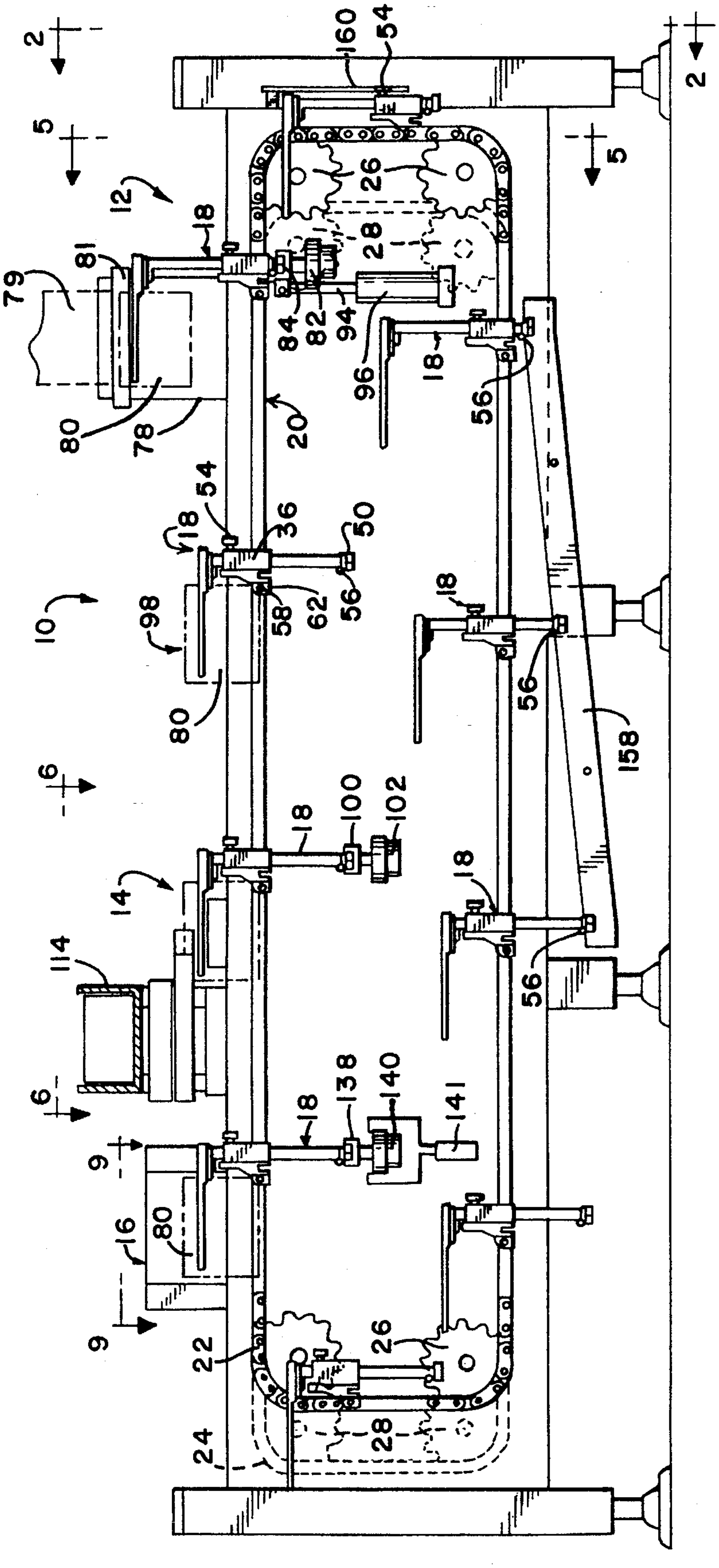
FIG. 1 is a schematic elevational view of a bag gripping and transfer apparatus according to the invention, with certain portions omitted for purposes of clarity.
Figure 4:
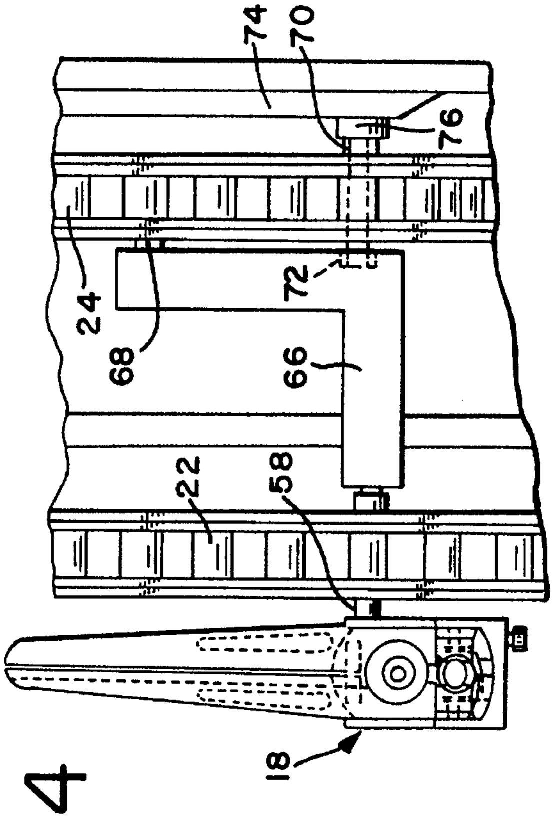
FIG. 4 is a similarly enlarged view taken along lines 4—4 of FIG. 3.
Figure 3:
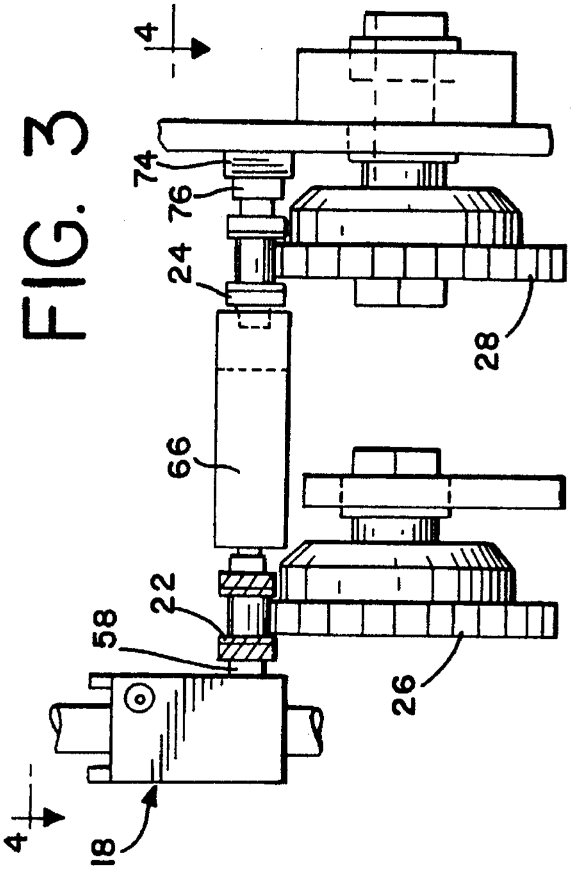
FIG. 3 is an enlarged partial end elevational view similar to FIG. 2, showing additional detail.

A bag gripping and transfer apparatus according to the invention is shown generally at 10 in the drawing figures. The bag gripping and transfer apparatus is a fully automatic, recirculating apparatus, and includes three basic operating stations, an upstream bag presentation and accepting station 12, a midstream label application station 14 located further downstream, and a fully downstream label sealing and bag release station 16. The basic processes of the invention are performed at the three stations 12 through 16, and in order to transfer bags from one location to another, the invention employs a series of grippers 18 which are maintained on and carried by a recirculating transfer conveyor 20. The conveyor 20 is in the form of two chains 22 and 24 which are longitudinally offset in order to maintain the grippers 18 in the upright orientation shown in FIG. 1. The recirculating transfer mechanism disclosed and claimed in U.S. Pat. No. 5,213,198 may be used for the conveyor 20.

The chains 22 and 24 of the conveyor 20 pass over appropriate sprockets, four sprockets 26 for the chain 22 being illustrated, and four sprockets 28 for the chain 24 being illustrated. Obviously, as many or as few sprockets may be employed as are required for proper mounting and revolution of the chains 22 and 24. The chains 22 and 24 are driven in exact synchronism (driving motor not illustrated) so that the grippers 18 are always conveyed in an upright orientation, as explained in further detail below.

Figure 12:
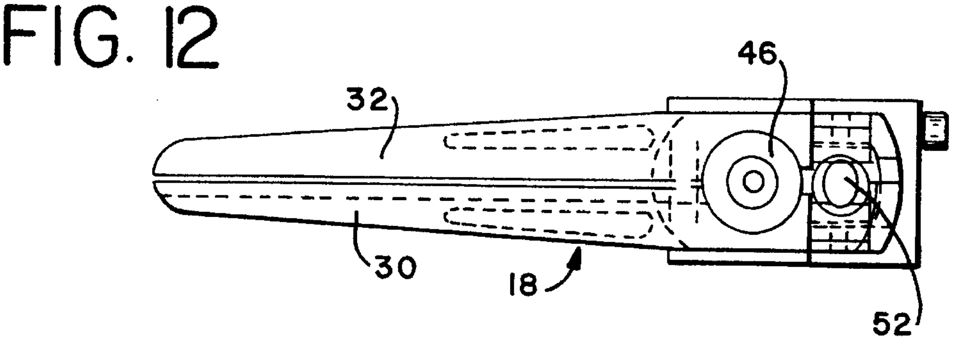
FIG. 12 is a top plan view thereof.
Figure 13:
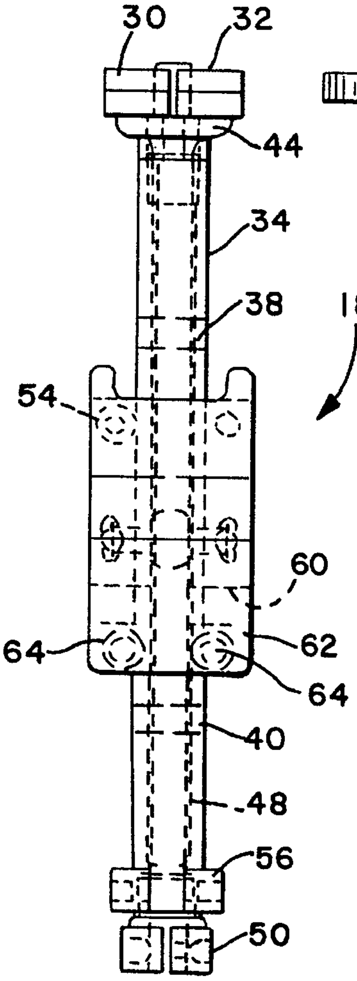
FIG. 13 is a front elevational view thereof.
Figure 11:
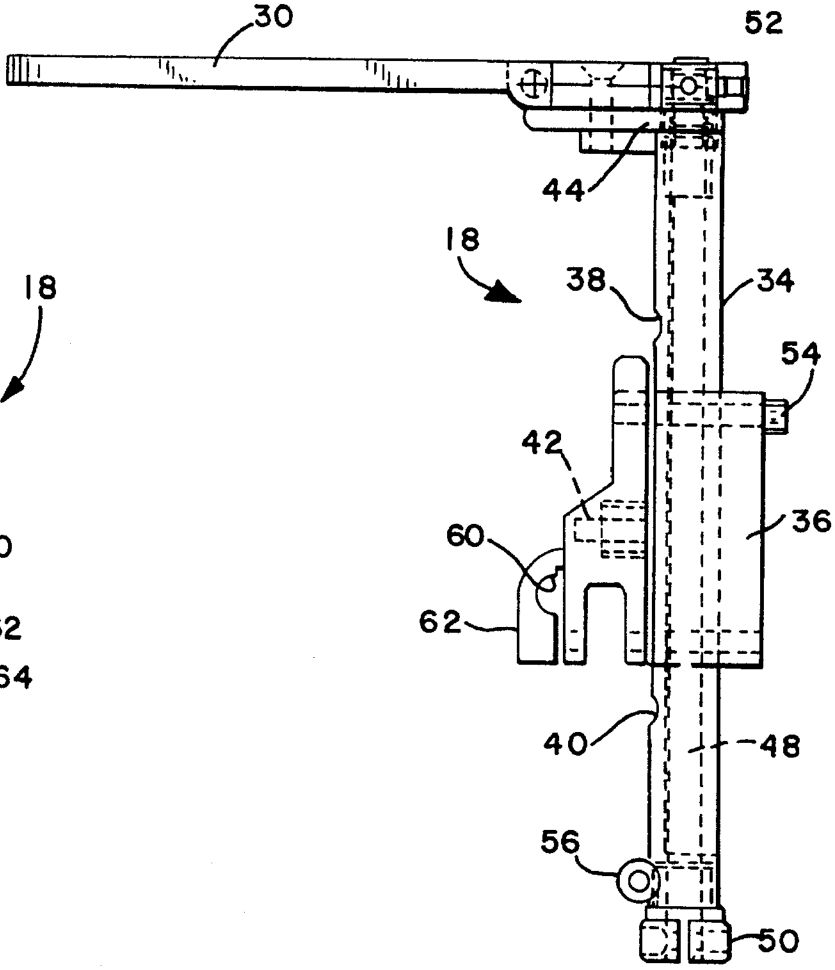
FIG. 11 is a side elevational illustration of one of the grippers and the actuating shaft upon which the gripper is mounted, and showing the shaft within its housing and partially translated between its upper and lower orientations.

Each of the grippers 18, as best shown in FIGS. 11 through 13, is composed of a pair of opposite gripping elements 30 and 32 which are mounted on an actuating shaft 34. The shaft 34, in turn, is mounted in a housing 36 and can be translated in the housing (upwardly and downwardly in relation to FIGS. 11 and 13) between an elevated orientation and a lowered orientation. The orientation shown in FIGS. 11 and 13 is midway between the upper and lower orientations.

The shaft 34 includes an upper detent 38 and a lower detent 40 for temporarily locking the shaft 34 respectively at the lower orientation and the upper orientation. The housing 36 includes a spring loaded locking pin 42 which engages a respective detent 38 or 40 to temporarily retain the gripper 18 at either the lower or upper orientation.

The elements 30 and 32 are mounted on a flange 44 extending outwardly from the top of the actuating shaft 34. The elements 30 and 32 are mounted on a central, spring loaded pivot 46 which biases the elements 30 and 32 in a normally opened orientation (opposite from that shown in FIG. 12). A rotary spindle 48 extends centrally within the shaft 34 between an actuating plug 50 and an eccentric head 52. The plug 50 is generally square in cross section. The eccentric head 52, in turn, extends between the elements 30 and 32. When the eccentric head 52 is rotated to the orientation illustrated in FIG. 12, with its longer axis perpendicular to the elements 30 and 32, the eccentric head 52 forces the elements 30 and 32 closed against the spring force of the central pivot 46. When the eccentric head 52 is rotated one quarter turn from the orientation shown in FIG. 12 (with its longer axis parallel to the elements 30 and 32), the spring force of the central pivot 46 opens the elements 30 and 32 to the extent permitted by the geometry of the elements and the minor axis of the eccentric head 52.

A cam follower 54 is mounted at the base of the actuating shaft 34. A cam follower 56 is mounted on the housing 36. The purposes of the cam followers 54 and 56 will become apparent in the further descriptions below.

The grippers 18 are affixed to the conveyor 20 by means of a series of locating spindles 58 extending laterally from the chain 22. Each spindle 58 has a flat side (not shown in detail), and engages a similarly-shaped hole 60 in a clasp 62 extending from the housing 36. Fasteners 64 are used to tightly secure the clasp 62 to the housing 36 and clamp the spindles 58 within their respective holes 60.

Figure 2:
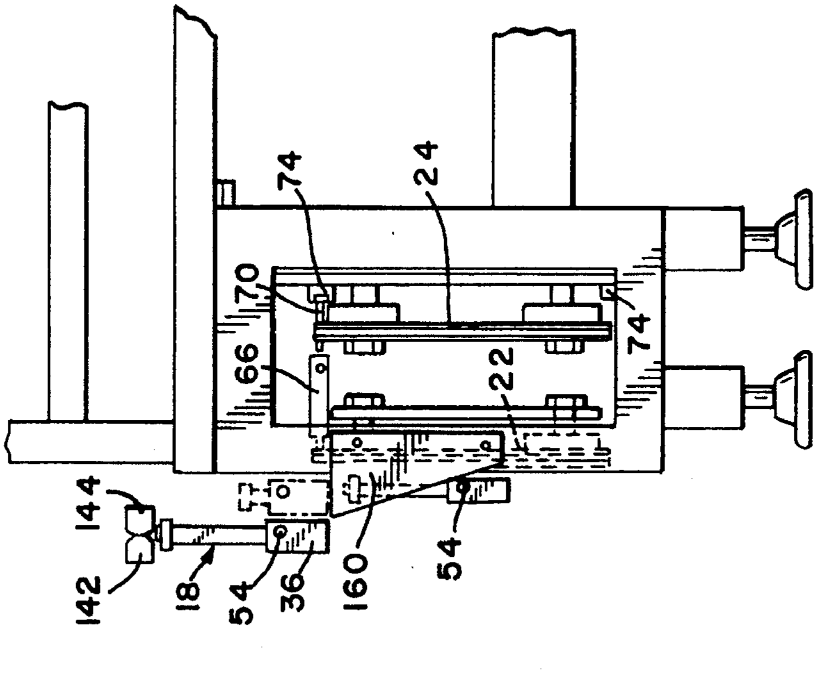
FIG. 2 is a partial end elevational illustration taken along lines 2—2 of FIG. 1, and showing the gripper in both its elevated, outboard position and, in phantom, its lowered, inboard position.

As best illustrated in FIGS. 2 through 5, each spindle 58 extends through a link of the chain 22 into an L-shaped bracket member 66. The bracket member 66, in turn, is permanently pinned at 68 to a link of the chain 24, offset from the spindle 58. As better explained in U.S. Pat. No. 5,213,198, the disclosure which is incorporated herein by reference, the offsetting of the spindle 58 and the pin 68 assures that the grippers 18 are always maintained in the same, upright orientation as best shown in FIG. 1. However, because of the offsetting of the spindles 58 and pins 68, when force is applied to the elements 30 and 32 (such as carrying of a bag), torsional forces will tend to overload the bracket member 68. To avoid overloading, a spring-loaded pin 70 is installed to engage an aperture 72 in the bracket member 66. The pin 70 is normally biassed out of engagement in the aperture 72 (to the right in FIGS. 2 through as shown in FIG. 2. However, a cam track 74 is oriented to engage a head 76 on the pin 70, urging the pin 70 into engagement in the aperture 72. That engagement locks the bracket member 66 in place, avoiding the effects of overloading. Cam tracks 74 are located adjacent both the top and bottom horizontal runs of the chain 24 for locking purposes. Appropriate pins 70 are located in the chain 24 for engaging the bracket members 66 along each run.

The bag accepting station 12 is where the outlet of a vertical form, fill and seal machine, designated generally at 78 in FIG. 1, releases a bag 80 to the header label application apparatus 10. The bag 80 is severed from a tube 79 and sealed by sealing jaws 81 of the machine 78 in what may be a conventional fashion. The machine 78 can be any machine for providing bags 80, and although it is preferred that the machine 78 be a vertical form, fill and seal machine, obviously any type of machine or dispensing mechanism capable of supplying appropriate bags in the correct orientation would be acceptable as an input to the bag gripping and transfer apparatus 10. Indeed the bags 80 can be manufactured elsewhere and simply conveyed to or provided to the apparatus 10 for use therein, so long as the bags 80 are properly positioned in the grippers 18. When the machine 78 is a vertical form, fill and seal machine, before the bag is released by the machine, it must be gripped by the gripper 18. Preferably, this occurs before the sealing jaws 81 of the machine are opened. Such a machine is depicted in U.S. Pat. No. 4,288,965, the disclosure of which is incorporated herein by reference.

Figure 5:
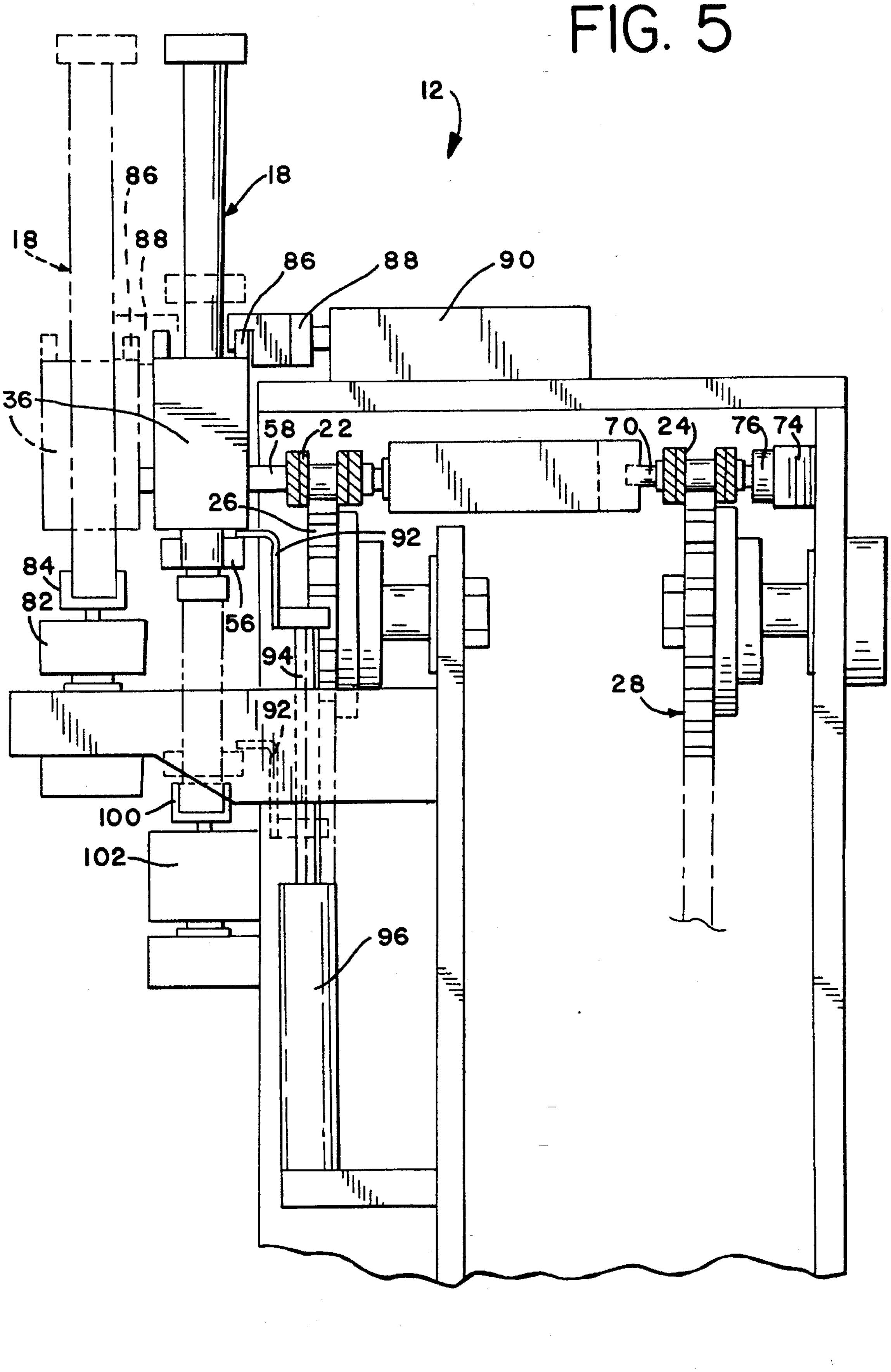
FIG. 5 is an enlarged cross-sectional view taken along lines 5—5 of FIG. 1 and also showing the gripper in bold fashion in the inboard, elevated orientation and in phantom fashion in the outboard elevated orientation and in the inboard, lowered orientation.

At the bag accepting station .12, each gripper 18 is presented at a bag presentation position in the raised, outboard orientation, as shown in FIG. 2, and as shown in phantom at the left in FIG. 5. Preferably, as the gripper 18 approaches the bag accepting station 12, a bag 80 is in the position shown in FIG. 1, and the gripping elements 30 and 32 are opened.

When the gripper 18, conveyed by the conveyor 20, enters the bag accepting station 12, the conveyor 20 stops with the gripper 18 seated in a grip actuator 82 (FIGS. 1 and 5). The actuator 82 includes a rotary cradle 84 which is shaped to engage the actuating plug 50 (FIGS. 11 and 13) of the gripper 18. The actuator 82 is then activated to rotate the cradle 84 one quarter turn, rotating the spindle 48 one quarter turn and therefore closing the elements 30 and 32 on the bag 80.

When the gripper 18 enters the bag accepting station 12, an upstanding lug 86 on the housing 36 (FIG. 5) also engages a gripper element 88 on the extendable ram of a linear actuator 90. After the cradle 84 has been rotated one quarter turn by the grip actuator 82 (to the orientation shown in FIG. 1) and the jaws 81 are opened to release the bag, the linear actuator 90 is then activated to laterally move the housing 36 (and therefore the entire gripper 18) from the outboard orientation (shown in phantom at the left of FIG. 5) to the inboard orientation (shown in bold in FIG. 5). The gripper 18 therefore is inboard in relation to the grip actuator 82 and is in a conveying position, but still in the raised orientation. This move is required to avoid impeding movement of the next bag being formed by the vertical form, fill and seal machine 78. If this move were not made, the vertical form, fill and seal machine 78 could not form the next bag until the bag just clamped is moved out of the way. This could produce a system delay which would reduce the throughput of the apparatus 10.

Once the gripper 18 is in the inboard orientation, the cam follower 56 is located beneath a finger 92 extending from the ram 94 of a vertical actuator 96. The actuator 96 is then activated, lowering the actuating shaft 34 to the lowered orientation (shown in phantom in FIGS. 2 and 5). The lowered orientation is also shown in FIG. 1 to the left of the bag accepting station 12 and in both the label application station 14 and the bag release station 16.

Once the gripper 18 is in the lowered orientation in the bag accepting station 12, and assuming that downstream activities in the label application station 14 and bag release station 16 have been completed (as described in greater detail below), the conveyor 20 is then advanced with the just-gripped bag 80 in the gripper 18 being advanced to an intermediate station 98. The only processing, if any, at the intermediate station 98 is to sense the presence of a gripped bag 80. This information can be used by the apparatus 10 to prevent the initiation of a label placement operation at the label application station 14 if there is no bag coming into the label placement station 14 from the intermediate station 98. If a label were inadvertently deployed, not only would a label be wasted, but potentially a stray label could jam the apparatus 10 in a number of places requiring the apparatus to be stopped to remove the undesired label. Of course, activities at each of the stations 12, 14 and 16 commence in their usual sequences, as described above and to be described below, in the normal course.

Figure 6:
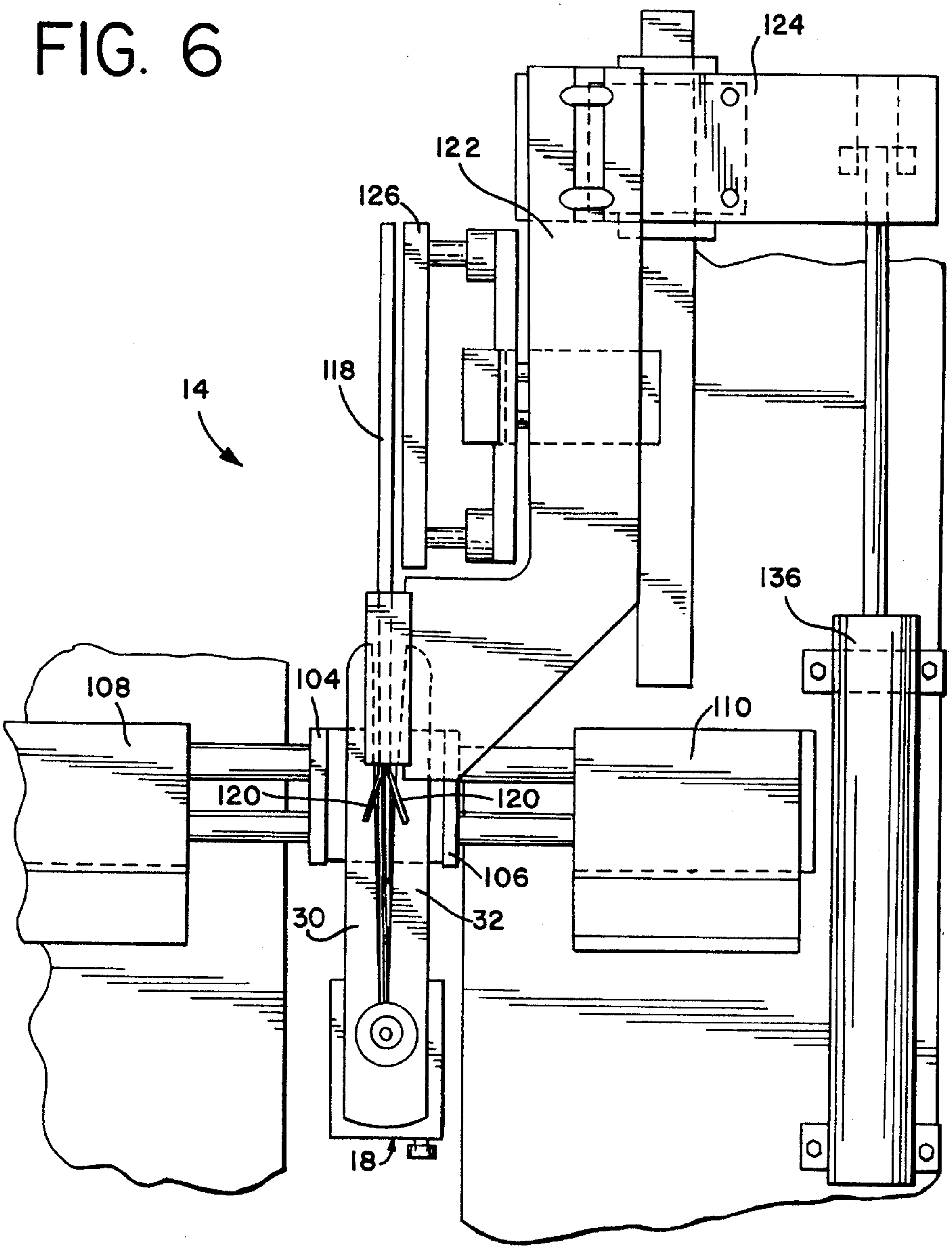
FIG. 6 is an enlarged top plan view taken along lines 6—6 of FIG. 1, with the label applicator omitted to show detail.
Figure 7:
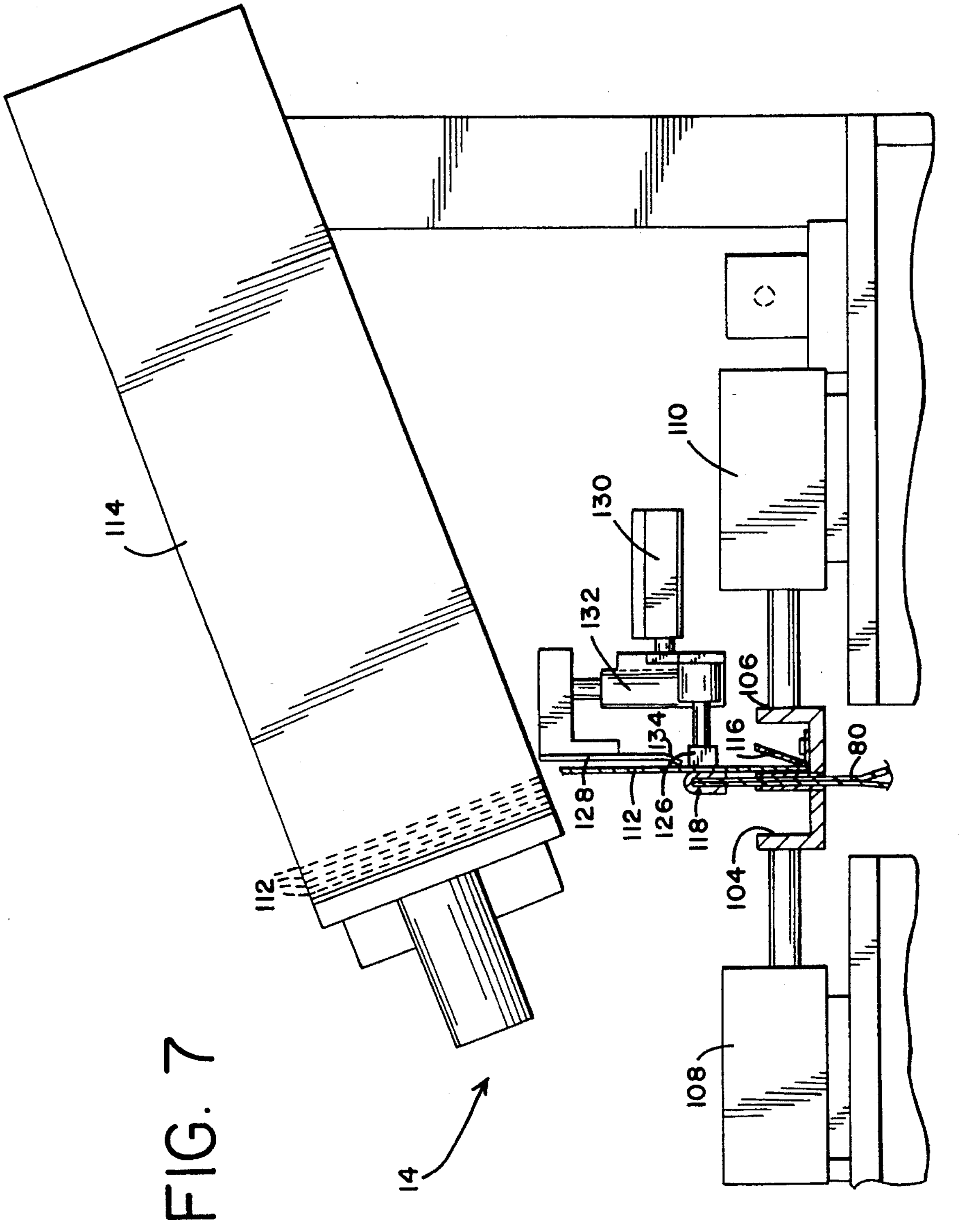
FIG. 7 is a cross-sectional illustration of the same scale as FIG. 6, and showing the header label applicator in place with a label having been emitted for readying for application to a bag.
Figure 8:
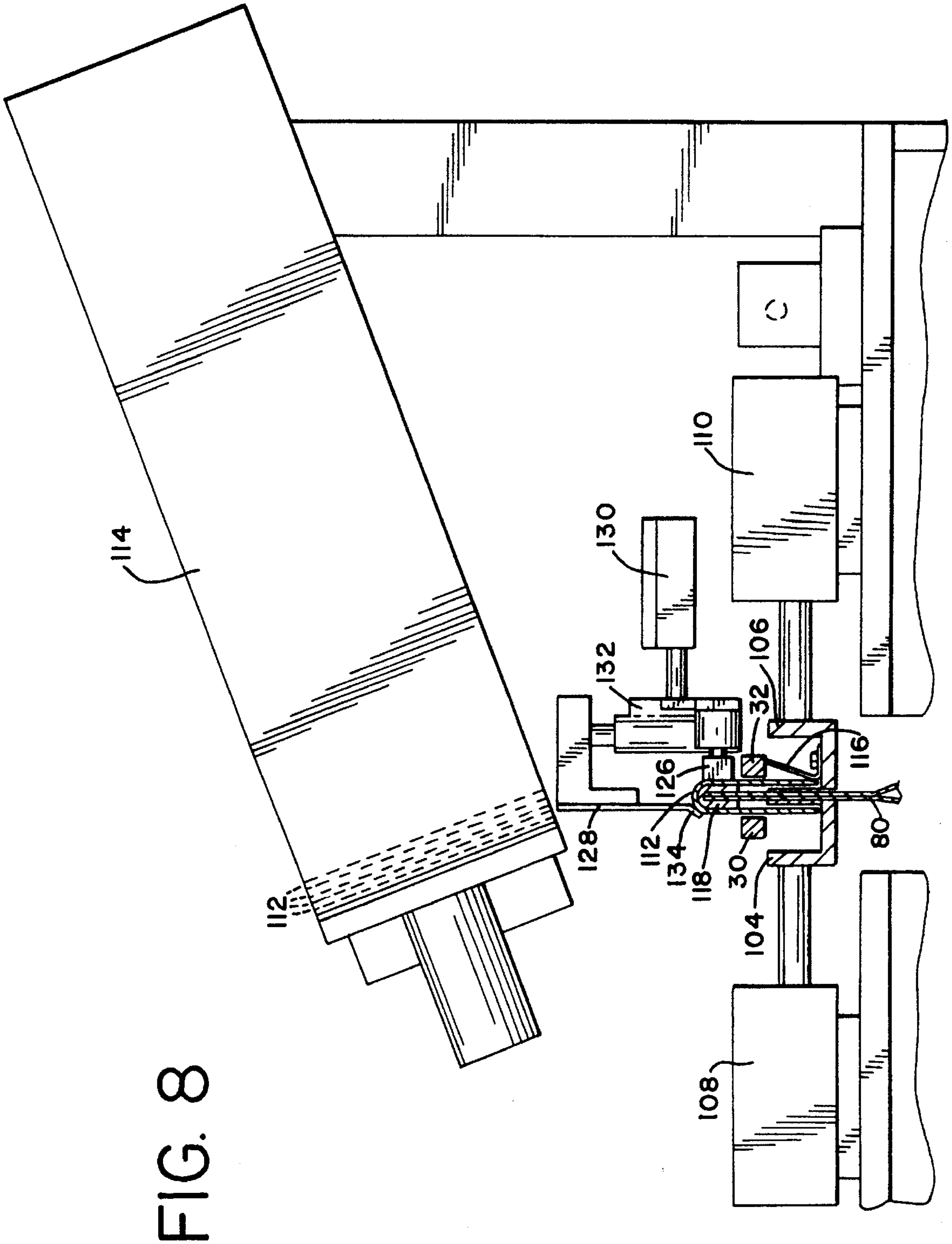
FIG. 8 is a view similar to FIG. 7, but with the label having been folded over and held in relation to the mandrel, and with the entire label orienting, folding, and applying mechanism having been indexed upstream.

The conveyor 20 then advances the gripper 18 to the label application station 14, as shown in FIG. 1 and in greater detail in FIGS. 6 through 8. When the gripper 18 enters the label application station 14, the actuating plug 50 engages a cradle 100 of a second rotary actuator 102. The cradle is initially oriented to accept the plug 50 with the elements 30 and 32 in the closed position. At the same time, a secondary gripper, in the form of opposed clamp elements 104 and 106, is closed on the bag 80 by their respective actuators 108 and 110 beneath the elements 30 and 32 to retain the bag 80 at the label application station 14. The actuator 102 is then activated to rotate the cradle 100 one quarter turn (to the orientation shown in FIG. 1) to open the elements 30 and 32.

At the same time, or in advance of the bag 80 being gripped between the clamp elements 104 and 106, a label 112 is emitted from a label hopper 114. The label hopper 114 may be conventional, and its details form no part of the present invention. The hopper 114 is appropriately formed and located so that single labels 112 can be emitted when desired for label processing.

The label hopper 114 is part of a label orienting, folding and applying mechanism. When the label 112 is emitted, it drops into a label locator or guide 116 adjacent to an elongated mandrel 118. The mandrel 118 as shown in FIGS. 6 through 8, is U-shaped in cross section with an internal channel, and includes an entry guide 120 to guide a bag 80 within the mandrel 118 as the conveyor 20 advances the series of grippers 18. The mandrel, in turn, is mounted on an arm 122 secured to a shiftable frame 124.

Once a label 112 is disposed in the label locator 116, a label clamp 126, also mounted on the frame 124, is activated by an actuator 130 to clamp the label against the mandrel 118. At the same time, a tucker plate 128 is activated to fold the label 112 over the mandrel 118. The tucker plate 128 is activated by two actuators, the actuator 130 and a second folding actuator 132, both of which are mounted on the frame 124. The actuator 130 laterally shifts the tucker plate 128 over the mandrel 118. The folding actuator 132 shifts the plate 128 downwardly toward the mandrel 118 after the actuator 130 is in its fully forward position with the tucker plate 128 over the mandrel 118. The tucker plate 128 includes a bottom foot 134 which, when the actuators 130 and 132 have been activated (as shown in FIG. 8), holds the folded label 112 over the mandrel 118. The combination of the clamp 126 and the bottom foot 134 of the tucker plate 128 then hold the label in position for transport to a waiting bag located upstream.

Once the label has been folded, an actuator 136, secured to the frame 124, is activated to shift the frame 124, and therefore the mandrel 118 with the label 112 folded thereabout, upstream so that the folded label 112 is disposed over the bag 80 and between the opened elements 30 and 32 (as in FIG. 8). The rotary actuator 102 is then reactivated to rotate the cradle 100 one quarter turn to reclose the elements 30 and 32 on both the folded label 112 and the top of the bag 80. With the bag and label therefore captured between the elements 30 and 32, the actuators 108 and 110 are deenergized and the clamp elements 104 and 106 return to their retracted positions. When both have been fully retracted and the remaining stations 12 and 16 have completed their respective cycles and the bag maker 78 is in the correct phase of its cycle, the conveyor 20 is activated, indexing the gripper 18 and removing the folded label laterally from the mandrel 118, advancing the bag 80 and the folded label 118 to the station 16.

The station 16 includes a cradle 138, a further rotary actuator 140, and a pair of heat sealing jaws 142 and 144. The jaw 142 is fixed to an overhead frame 146, while the jaw 144 is linearly displaceable by an actuator 148 also mounted in the frame 146. The entire frame assembly 146 may be vertically adjusted by means of a conventional handwheel arrangement 150 which is therefore not described in greater detail.

In operation, after the sealing jaws 142 and 144 have closed, the bag and label are suspended by the sealing jaws and the rotary actuator 140 is energized to unclamp the elements 30 and 32 of the gripper 18. Since the conveyor 20 cannot move with the cradle 138 rotated in the unlocked position (as shown in FIG. 1), and it is necessary to leave the station 16 with the gripper open, it is necessary to lower the actuator 140 and the cradle 138 to the point where the gripper 18 can pass over the cradle 138 without touching it. This is accomplished by using a lift actuator 141 as illustrated in FIG. 1. Once the conveyor 20 begins its next movement, the actuator 140 is rotated one quarter turn to accept the next gripper 18, and simultaneously the lift cylinder 141 is raised to engage the cradle 138 with the next gripper entering the station 16.

When a bag 80 with the folded label 112 enters the station 16, the jaw 144 is initially retracted by the actuator 148. When the gripper 18 is in place (with the actuating plug 50 engaged in the cradle 138), the actuator 148 is activated to close the jaws 142 and 144, applying heat and pressure in order to seal the folded label 112 to the bag 80. Preferably, the bag 80 is made of plastic and the label 112 is made of paper. By the application of heat and pressure between the jaws 142 and 144, plastic of the bag 80 migrates into the fibers of the paper label 112, sealing the label to the bag. Alternatively, the label 112 can be coated with an appropriate plastic material so that when heat and pressure is applied, the label 112 readily adheres to the bag 80. Under normal circumstances, however, coating of any kind is not required.

Figure 9:
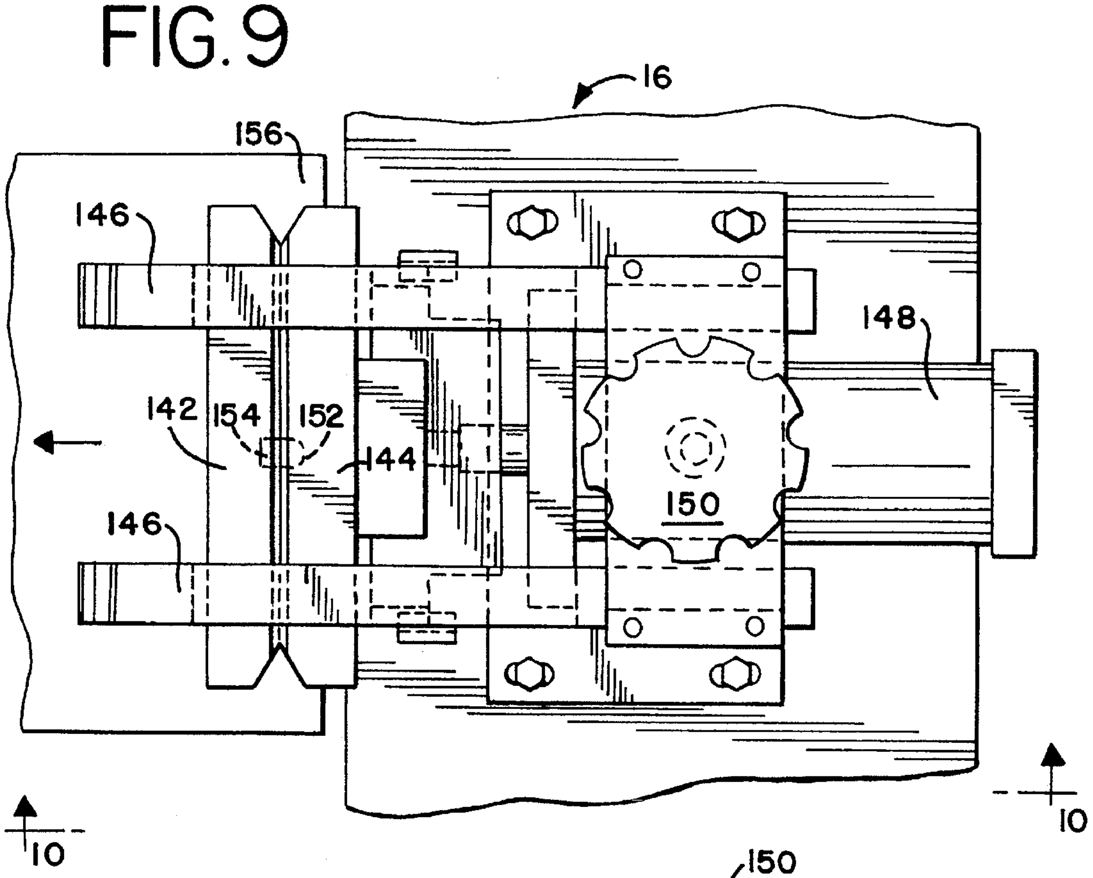
FIG. 9 is an enlarged top plan view taken along lines 9—9 of FIG. 1.
Figure 10:
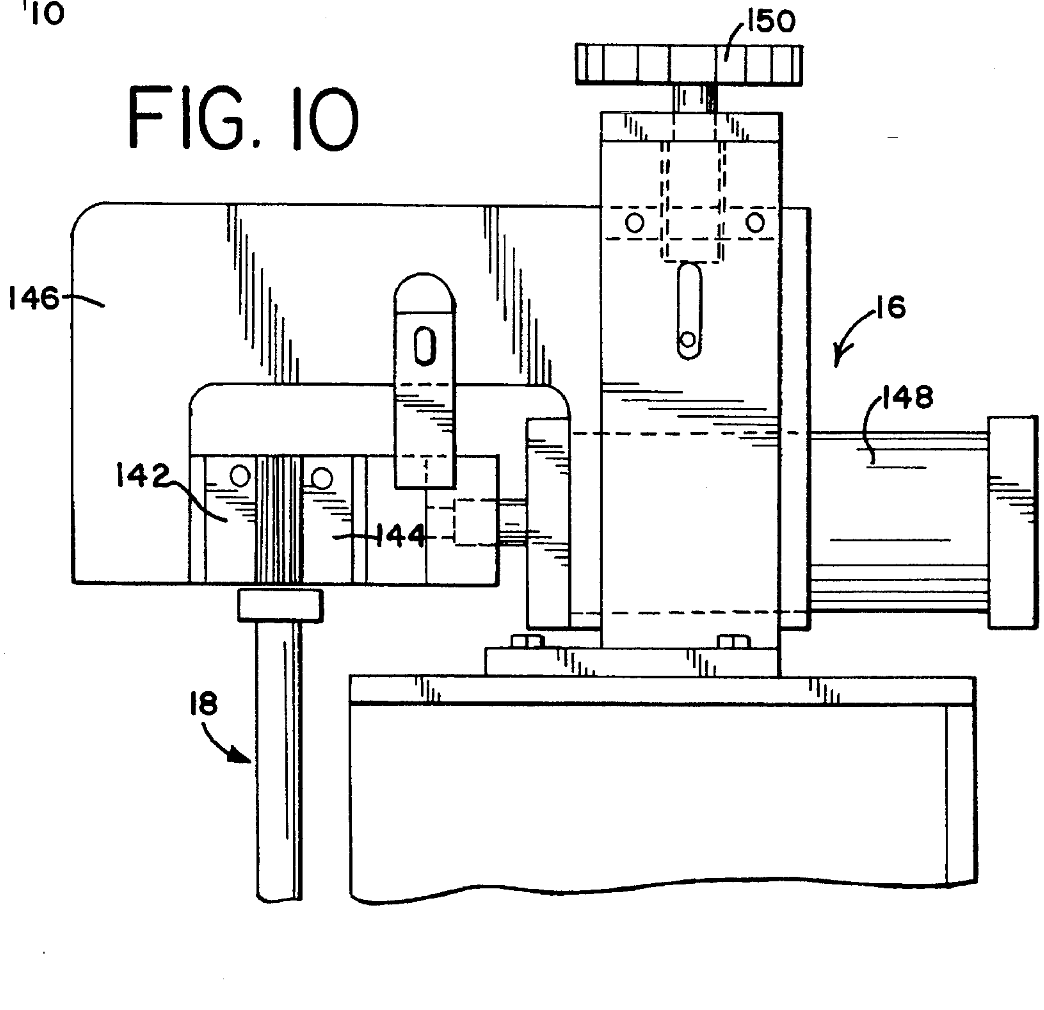
FIG. 10 is a view of similar scale taken along lines 10—10 of FIG. 9.

The finished package can also be hole punched at the station 16. The jaws 142 and 144 include a hole punch for that purpose. As shown in FIG. 9, a punch ball 152 is located in the jaw 144. A cavity 154 is located in the jaw 142, the cavity conforming to the punch ball 152 and having sharp edges so that when the jaws 142 and 144 are closed, the ball severs a circular hole in the finished package. Preferably, the punched material is not completely severed from the bag since the cavity 154 would soon be filled. Instead, the rim of the cavity 154 is sharp except for a very small section so that a hole is completely punched except for that small section. Then, when the jaws 142 and 144 open, a hole appears in the bag, but the punched material remains attached to the bag as it is released.

After the label 112 has been sealed to the bag 80, it is released from both the heat sealing jaws 114 and also the gripper 18. The actuator 148 is activated to open the jaws 144. The finished bag drops from the jaws by gravity force, preferably onto a conveyor 156 (FIG. 9) which transports the finished bag for further handling or packaging.

As explained above, the bags 80 are accepted at the station 12 with the gripper 18 oriented with the shaft 34 in the raised orientation and with the housing 36 in the outboard orientation. However, when a gripper 18 departs the station 16, the shaft 34 is in the lowered orientation, and the housing 36 is in the inboard orientation. To return the shaft 34 to the raised orientation, a cam track 158 is oriented to engage each of the grippers 18 as they return to the station 12. As seen in FIG. 1, the cam track 158 is inclined, and engages each cam follower 56 to raise the shaft 34 to the elevated orientation.

Next, as a gripper 18 commences the vertical leg of its travel along the conveyor 20 as it returns to the station 12, the cam follower 54 engages an outwardly inclined cam 160. The housing 36 is therefore shifted to the outboard orientation and is ready to be presented to the bag accepting station 12.

The operation of all of the actuators and the conveyor 20 is controlled by an appropriate means (not illustrated), such as a computer which is programmed to control the functions of the various elements of the invention as described above and in the sequence of operation to be described below. A general purpose computer or programmed controller can be used for that purpose, or a special processor can be constructed to perform the various functions of the invention. Given the description of the invention, providing an appropriate controller would be apparent to one skilled in the art. In addition, although not illustrated in the drawings or described above, various sensors can be located in the apparatus 10 to assure that steps of operation have taken place before the conveyor 20 is reactivated or various ones of the actuators are activated. For example, a sensor can be located to sense a label 112 as it is emitted from the label hopper 114 into the label locator 116 in order to assure that the label has been fully seated in the label locator 116. Other sensors can be located throughout the apparatus 10 for similar and other purposes.

The bag gripping and transfer apparatus 10 is operated in a continuous fashion with the gripper 18 stopping temporarily at each of the stations 12, 14 and 16 for performance of the various functions at those stations. The sequence of operation of the apparatus 10 will now be explained, tracing the path of travel of one gripper 18, beginning at the bag accepting station 12 and ending as the gripper 18 returns to the bag accepting station 12 in the sequence of operation of the apparatus 10.

At the bag presentation and accepting station 12, the gripper is oriented with the housing 36 in the outboard orientation and the actuating shaft 34 raised to the elevated orientation. The elements 30 and 32 are opened to accept a bag 80 as it enters the apparatus 10 from the vertical form, fill and seal machine 78.

With the bag 80 poised between the opened elements 30 and 32, the rotary actuator 82 is activated to rotate the cradle 84 one quarter turn, closing the elements 30 and 32 to grip the bag 80. When the jaws 81 open, the actuator 90 is activated to withdraw the housing 36 from the outboard orientation to the inboard orientation. Immediately thereafter, the actuator 96 is activated to withdraw the shaft 34 from the elevated orientation to the lowered orientation. The station 12 has now completed its process steps and is ready to allow the gripped bag 80 to be transferred downstream. When the stations 14 and 16 have completed their processing steps and a command signal is received by the controller to index the gripper 18, the conveyor 20 is then activated to advance the lowered and inboard gripper 18 to the intermediate station 98 from the accepting station 12. The gripper 18 is then advanced in sequence to the label application station 14.

At the label application station 14, the actuators 108 and 110 are activated to close the clamp elements 104 and 106 on the bag 80 beneath the elements 30 and 32. The rotary actuator 102 is then activated to rotate the cradle 100 one quarter turn to open the elements 30 and 32. At the same time, a label is dispensed from the label hopper 114 to the label pocket guide 116. The label clamp 126 is activated by the actuator 130 to clamp the label 112 against the mandrel 118, and the actuator 132 is activated to fold the label 112 about the mandrel 118 and retain the label in place in its folded orientation. The actuator 136 is then activated to shift the folded label 112 and mandrel 118 upstream directly above the bag 80 as it is clamped between the clamp elements 104 and 106. The gripping elements 30 and 32 are then closed (by rotating the cradle 100 one quarter turn), and the clamp elements 104 and 106 are opened. The conveyor 20 is then activated to index the gripped label and bag off the mandrel 118 from the station 14 to the station 16.

At the station 16, the actuator 148 is activated to close the jaws 142 and 144. The jaws 142 and 144 apply heat and pressure to seal the label 112 to the bag 80. Also, a hole is optionally punched through the label and bag by the ball 152 and cavity 154. After the sealing jaws 142 and 144 have closed, the bag 80 and the label are suspended and the rotary actuator 140 is energized to unclamp the gripping elements 30 and 32. The bag is then released. The cradle 138 and the actuator 140 are lowered by the lift actuator 141 sufficiently beneath the gripper 18 to allow the gripper 18 to pass over the cradle 138 without interference. Once the conveyor 20 is then reenergized to index the gripper 18, the rotary actuator 140 is energized to rotate the cradle 138 one quarter turn to accept the next gripper, and simultaneously the actuator 141 is raised to engage the next gripper 18 as it enters the station 16.

Thereafter, the gripper 18 advances with the conveyor 20 to the cam track 158, where the cam follower 56 is engaged to raise the shaft 34 to the elevated orientation. As the gripper 18 begins its final vertical leg, the cam follower 54 engages the cam 160, shifting the housing 36 to the outboard orientation. As the cam follower 54 leaves the cam 160, the gripper 18 is poised with the housing 36 in the outboard orientation and the actuating shaft 34 in the elevated orientation, ready to accept a further bag 80 as it emanates from the vertical form, fill and seal machine 78.

Various changes can be made to the invention without departing from the spirit thereof or scope of the following claims. As an example only, while various linear actuators have been depicted and described as performing the functions set forth above, obvious other means of shifting elements can be employed, as well. Also, the gripping elements 30 and 32 are depicted in a scissor fashion, but obviously different elements, similar to the clamp elements 104 and 106, could be employed instead.

What is claimed:

1. An apparatus for gripping a bag made on a vertical form, fill and seal machine and handling the bag after it is gripped, comprising a. a gripper for gripping the bag immediately below sealing jaws of said machine, b. means for moving said gripper in relation to the bag from a side of the bag to a position for gripping the bag along a top portion of the bag below said jaws, c. means for actuating said gripper for gripping the bag before the bag is released from said machine, d. means for moving the gripped bag out of the path of a next bag as said machine forms the next bag without first moving the gripped bag in a downstream direction in relation to said machine, and e. means for transferring the moved and gripped bag in the downstream direction to a downstream position for further processing of the bag.

2. An apparatus according to claim 1 in which said gripper comprises opposite gripping elements mounted on an actuating shaft, said shaft being located in a housing and including means mounting said housing on said transferring means.

3. An apparatus according to claim 2 in which said moving means includes an actuator engageable with and for shifting said housing from a bag presentation position to a bag conveying position.

4. An apparatus according to claim 3 in which said housing includes a lug and said actuator includes a gripper element selectively engageable with said lug.

5. An apparatus according to claim 2 in which said mounting means includes a locating spindle extending laterally from said transferring means, said housing being slidably mounted on said locating spindle.

6. An apparatus according to claim 2 in which said housing includes clamping means for said actuating shaft to retain said shaft at an elevated orientation and a lowered orientation and to permit vertical translation of said shaft.

7. An apparatus according to claim 6 including an actuator engageable with said shaft to lower said shaft from said elevated orientation to said lowered orientation.

8. An apparatus according to claim 2 in which said actuating means comprises a rotary spindle extending in said actuating shaft, and means for rotating said spindle to open and close said gripping elements.

9. An apparatus according to claim 1 including a label application station at a downstream location, said label application station including a first position for readying a label for application to the bag and a second position for applying the label to the bag, said second position being upstream of said first position, and including means for sealing the label to the bag.

10. A process of gripping a bag and handling the bag after it is gripped, comprising the steps of a. gripping the bag with gripping elements at an upstream bag presentation position, including i. engaging the gripping elements on opposite sides of the bag while the elements are open, and ii. closing the elements to grip the bag, b. laterally shifting the bag from said presentation position to a transferring position, c. lowering the bag at the transferring position from an elevated orientation to a lowered orientation, and d. transferring the gripped bag to a downstream position.

11. A process according to claim 10, in which before step "a" there is the step of presenting the bag to the bag presentation position in a predetermined orientation.

12. A process according to claim 10, including the step of returning the gripping element to the bag presentation position.

13. A process according to claim 10, including the step of returning the gripping element to the bag presentation position, and during the returning step:

i. raising the gripping elements from the lowered orientation to the raised orientation, and ii. laterally shifting the gripping elements from the transferring position to the presentation position.

14. A process of gripping a bag made on a vertical form, fill and seal machine and handling the bag after is gripped, comprising the steps of a. gripping the bag with gripping elements immediately below sealing jaws of said machine at a bag presentation position, including i. engaging the gripping elements on opposite sides of the bag while the elements are open, and ii. closing the elements to grip the bag before said sealing jaws are opened, b. laterally shifting the bag from said presentation position to a transferring position, c. lowering the bag at the transferring position from an elevated orientation to a lowered orientation, and d. transferring the gripped bag to a downstream position.

* * * * *